United States Patent
Hung

(10) Patent No.: US 8,497,955 B2
(45) Date of Patent: Jul. 30, 2013

(54) SUBSTRATE UNIT, DISPLAY MODULE, AND DISPLAY APPARATUS

(75) Inventor: Chen-Pin Hung, Miao-Li County (TW)

(73) Assignee: Chimei Innolux Corporation, Miao-Li County (TW)

( * ) Notice: Subject to any disclaimer, the term of this patent is extended or adjusted under 35 U.S.C. 154(b) by 446 days.

(21) Appl. No.: 12/823,153

(22) Filed: Jun. 25, 2010

(65) Prior Publication Data
US 2010/0328585 A1 Dec. 30, 2010

(30) Foreign Application Priority Data

Jun. 30, 2009 (TW) .............................. 98122028 A

(51) Int. Cl.
*G02F 1/1335* (2006.01)
(52) U.S. Cl.
USPC ............................................ 349/96; 349/106
(58) Field of Classification Search
USPC ................................................... 349/58, 96
See application file for complete search history.

(56) References Cited

U.S. PATENT DOCUMENTS

| 7,423,707 B2 * | 9/2008 | Yoon ................................ 349/96 |
| 2007/0279560 A1 * | 12/2007 | Ishitani et al. ................ 349/116 |
| 2009/0096765 A1 * | 4/2009 | Kuo et al. ...................... 345/174 |
| 2009/0213291 A1 * | 8/2009 | Choi ................................ 349/58 |
| 2009/0290105 A1 * | 11/2009 | Takada ............................ 349/96 |

FOREIGN PATENT DOCUMENTS

JP        2000206520 A  *  7/2000
WO   WO 2009038398 A2  *  3/2009

* cited by examiner

*Primary Examiner* — Hemang Sanghavi
(74) *Attorney, Agent, or Firm* — McClure, Qualey & Rodack, LLP

(57) ABSTRACT

A substrate unit, which can be disposed opposite to a display panel, includes a substrate and a color filter layer. The substrate has a front surface and a rear surface. The rear surface is disposed adjacent to the display panel. The color filter layer is disposed on the rear surface or between the front surface and the rear surface. A display module and a display apparatus including the substrate unit are also disclosed.

17 Claims, 6 Drawing Sheets

SUBSTRATE UNIT, DISPLAY MODULE, AND DISPLAY APPARATUS

CROSS-REFERENCE TO RELATED APPLICATION

The present application claims priority to Taiwan application 98122028, filed Jun. 30, 2009.

BACKGROUND

1. Field

The disclosure relates to a substrate unit and a display module and, in particular, to a substrate unit and a display module applied to a display apparatus.

2. Related Art

Liquid crystal display (LCD) apparatuses have advantages over cathode ray tube (CRT) display apparatuses such as low power consumption, less heat, light weight, and no radiation. Because of these advantages, LCD apparatuses have been widely used in various electronic products and gradually are replacing traditional CRT display apparatuses.

In general, an LCD apparatus includes an LCD panel and a backlight module. The LCD panel has a thin film transistor (TFT) substrate, a color filter (CF) substrate, and a liquid crystal (LC) layer sandwiched between the two substrates. Additionally, the LCD panel includes a plurality of pixels that are formed in array configured by the substrates and the LC layer. The backlight module causes the light emitted from a light source to be evenly distributed to the LCD panel, and the pixels can thus display desired colors to form an image.

FIG. 1 illustrates a display panel 20 including a CF substrate 21, an LC layer 22, and a TFT substrate 23. The LC layer 22 is sandwiched between the CF substrate 21 and the TFT substrate 23, and the LC layer 22 contains LC molecules 221 and spacers 222.

The CF substrate 21 mainly includes an alignment layer 211, a transparent electrode layer 212, a passivation layer 213, a color filter layer 214, and a light-shielding layer 215, which are sequentially disposed on a side of a glass plate 216. In addition, the CF substrate 21 further includes a polarizing layer 217 which is disposed on the other side of the glass plate 216. The TFT substrate 23 mainly includes an alignment layer 231 and a semiconductor layer 232, which are sequentially disposed on a side of a glass plate 233. Also, the TFT substrate 23 further includes a polarizing layer 234 which is disposed on the other side of the glass plate 233.

The light emitted by a backlight (not shown) will pass through the TFT substrate 23, the LC layer 22, and the CF substrate 21 sequentially, and images can be formed thereby. During the travelling, the light first passes through the polarizing layer 234 and gets polarized. Second, the light passes through the color filter layer 214 and then reaches another polarizing layer 217. However, because the color filter layer 214 contains a pigment composed of particles, when the light passes through the color filter layer 214, the polarization of the light that is previously polarized by the polarizing layer 234 will change due to the Mie scattering or the Rayleigh scattering by the color filter 214. Accordingly, the polarization of a portion of the light will be changed undesirably before the light passes through the polarizing layer 217. Hence, light leakage at the dark state and lower transmittance at the bright state will occur, and thus the display efficiency will be lowered.

SUMMARY

Embodiments of the present disclosure provide a substrate unit, a display module, and a display apparatus. Briefly described, one embodiment of a substrate unit, among others, can be implemented as follows. A substrate unit, which is disposed opposite to a display panel, comprises a substrate having a front surface and a rear surface. The rear surface being disposed adjacent to the display panel. The substrate unit further comprises a color filter layer that is disposed on the rear surface or between the front surface and the rear surface.

One embodiment of a display module, among others, can be implemented as briefly described as follows. A display module comprises a display panel and a substrate unit disposed opposite to the display panel. The substrate unit comprises a substrate having a front surface and a rear surface. The rear surface is disposed adjacent to the display panel. The substrate unit further comprises a color filter layer disposed between the front surface and the display panel.

One embodiment of a display apparatus, among others, can be implemented as briefly described as follows. The display apparatus comprises a casing, a display panel disposed in the casing, and a substrate unit disposed opposite to the display panel. The substrate unit comprises a substrate having a front surface and a rear surface. The rear surface is disposed adjacent to the display panel while the front surface is exposed to the casing. The substrate unit further comprises a color filter layer disposed between the front surface and the display panel.

Other elements, features, and advantages of the present disclosure will be or become apparent to one with skill in the art upon examination of the following drawings and detailed description. It is intended that all such additional elements, features, and advantages be included within this description, be within the scope of the present disclosure, and be protected by the accompanying claims.

BRIEF DESCRIPTION OF THE DRAWINGS

The disclosure will become more fully understood from the detailed description and accompanying drawings, which are given for illustration only, and thus are not limiting, and wherein.

Various embodiments of the disclosure will be apparent from the following detailed description, which refers to the accompanying drawings, wherein the reference numbers refer to the same or similar features throughout the disclosure.

DETAILED DESCRIPTION

Figure 1:
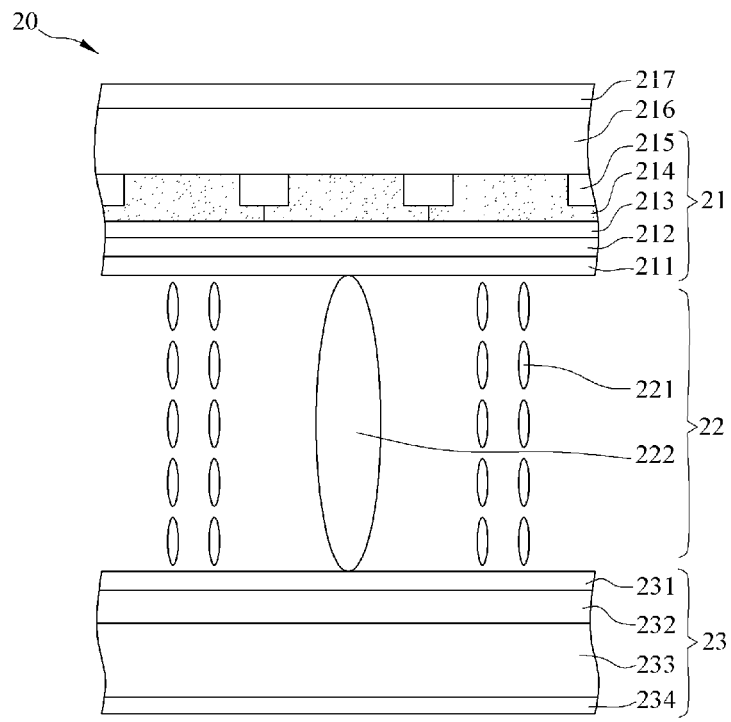
FIG. 1 is a schematic diagram of a conventional display panel.
Figure 2:
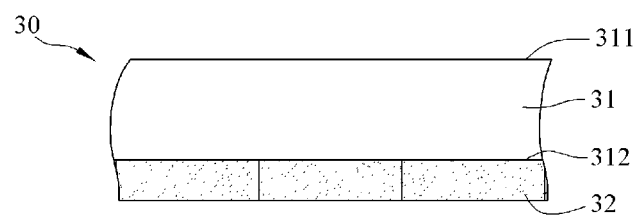
FIG. 2 is a schematic diagram of an embodiment of a substrate unit.

The present disclosure describes various embodiments of a substrate unit, a display module, and a display apparatus. FIG. 2 is a cross-sectional view of an embodiment of a substrate unit 30 including a substrate 31 and a color filter layer 32. The substrate 31 has a front surface 311 and a rear surface 312. The substrate 31 may include a transparent material, e.g.

glass. In some embodiments, the substrate 31 is a functional panel such as a touch panel, and the touch panel may be a resistive type, a capacitive type, an infrared type, a surface acoustic wave type, or an optical imaging type. If the substrate 31 is a touch panel, the front surface 311 may serve as the touch surface.

In the embodiment of a substrate unit 30 illustrated in FIG. 2, the color filter layer 32 is disposed on the rear surface 312. In some embodiments, the color filter layer 32 is directly formed on or adhered to the rear surface 312. For example, the color filter layer 32 may be directly formed on the rear surface 312 by screen printing or deposition, e.g. physical deposition or chemical deposition. The color filter layer 32 filters light to generate, for example, but not limited to, one of three primary colors (red, green or blue), or other colors.

Figure 3:
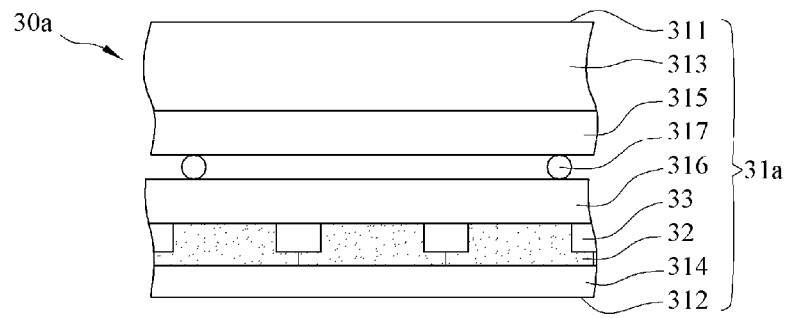
FIG. 3 is a schematic diagram of another embodiment of a substrate unit.

FIG. 3 is a cross-sectional view of another embodiment of a substrate unit 30a. In the embodiment illustrated in FIG. 3, the color filter layer 32 is disposed between the front surface 311 and the rear surface 312 of a substrate 31a, and the substrate 31a that is a touch panel of a resistive type. As shown in FIG. 3, the substrate 31a of the substrate unit 30a includes two transparent plates 313 and 314 located opposite to each other. Two transparent electrode layers 315 and 316 are disposed on the transparent plates 313 and 314, respectively, and the two transparent electrode layers 315 and 316 are separated by a spacer layer 317.

Also, in the embodiment illustrated in FIG. 3, the color filter layer 32 is disposed between the transparent electrode layer 316 and the transparent plate 314. The substrate unit 30a further includes a light-shielding layer 33 that may be a black matrix (BM), for example, and the light-shielding layer 33 is disposed corresponding to the color filter layer 32. The light-shielding layer 33 can be disposed on the rear surface 312, or between the front surface 311 and the rear surface 312. In FIG. 3, the light-shielding layer 33 is disposed between the front surface 311 and the rear surface 312.

The substrate unit 30 of FIG. 2 or the substrate unit 30a of FIG. 3 can be assembled with a display panel to form a display module. For the display module, because the light will pass through the polarizing layers of the display panel prior to the color filter layer 32 of the substrate unit 30 or 30a, the light will not be changed in polarization by the scattering of the color filter layer 32 before passing through the polarizing layers, thereby enhancing display efficiency.

Figure 4:
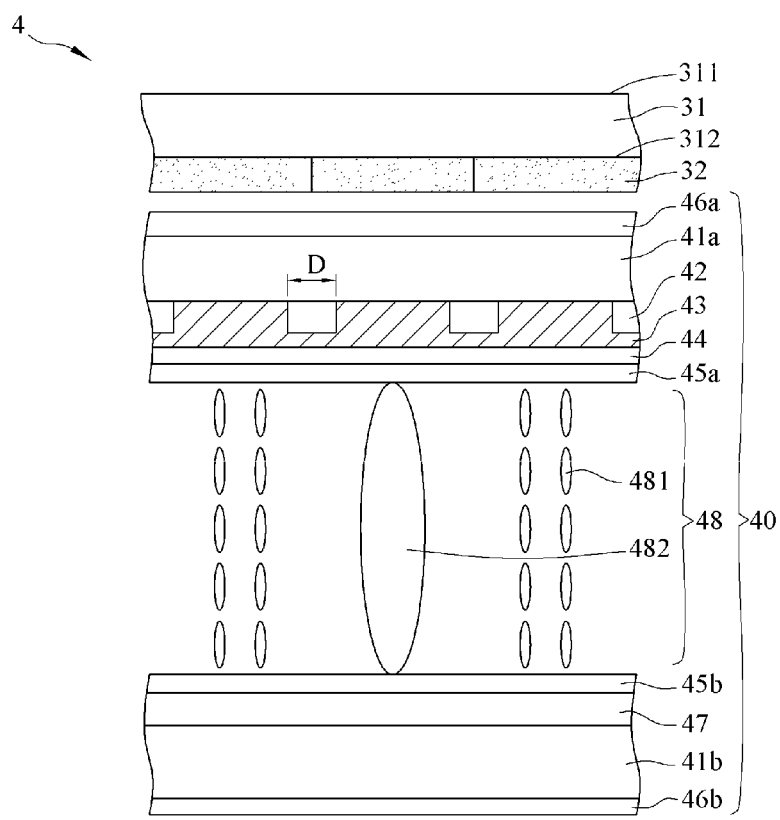
FIG. 4 is a schematic diagram of a first embodiment of a display module.

FIG. 4 is a schematic diagram of a first embodiment of a display module 4. The display module 4 includes a substrate 31, a display panel 40, and a color filter layer 32. The features of the substrate 31 and the color filter layer 32 discussed above with respect to the substrate unit 30 are applicable to the display module 4 as well, and the detailed descriptions thereof are therefore omitted here.

The display panel 40 is located opposite of the rear surface 312 of the substrate 31. The type of the display panel 40 is not limited, and the display panel 40 can be, for example, a flat display panel, and flexible or inflexible. The flat display panel may be, for example, an LCD panel, a light-emitting diode (LED) display panel, an electroluminescence (EL) display panel, a surface-conduction electron-emitter display (SED) panel, or a field emission display (FED) panel. An LCD panel is instantiated as the display panel 40 of the embodiment.

The display panel 40 includes two transparent plates 41a and 41b disposed opposite to each other. A light-shielding layer 42, a passivation layer 43, a transparent electrode layer 44, and an alignment layer 45a are disposed on a side of the transparent plate 41a sequentially, and a polarizing layer 46a is disposed on the other side of the transparent plate 41a. A semiconductor layer 47 and an alignment layer 45b are disposed on a side of the transparent plate 41b, and a polarizing layer 46b is disposed on the other side of the transparent plate 41b. The semiconductor layer 47 can include transparent electrodes and thin film transistors. The display panel 40 further includes a liquid crystal layer 48 that is disposed between the two alignment layers 45a and 45b and contains liquid crystal molecules 481 and spacers 482.

For the display module 4, the light will pass through two polarizing layers 46b and 46a prior to the color filter layer 32, so the light will not be changed in polarization due to the color filter layer 32 before reaching the polarizing layer 46a, so as to enhance display efficiency.

Furthermore, in some embodiments, because the color filter layer 32 and the light-shielding layer 42 are aligned with each other and disposed on different substrates, the alignment of the color filter layer 32 and the light-shielding layer 42 has a tolerance that is a width D of a single element of the light-shielding layer 42, so that the yield of an assembly can be increased.

To be noted, the color filter layer 32 can be disposed between the front surface 311 of the substrate 31 and the display panel 40. For instance, the color filter layer 32 can be disposed on the rear surface 312 as in the embodiment illustrated in FIG. 4, or between the front surface 311 and the rear surface 312 as the position of the substrate unit 30a, or between the polarizing layer 46a and the front surface 311. Also, the light-shielding layer 42 can be disposed on the display panel 40 or the substrate 31.

Figure 5:
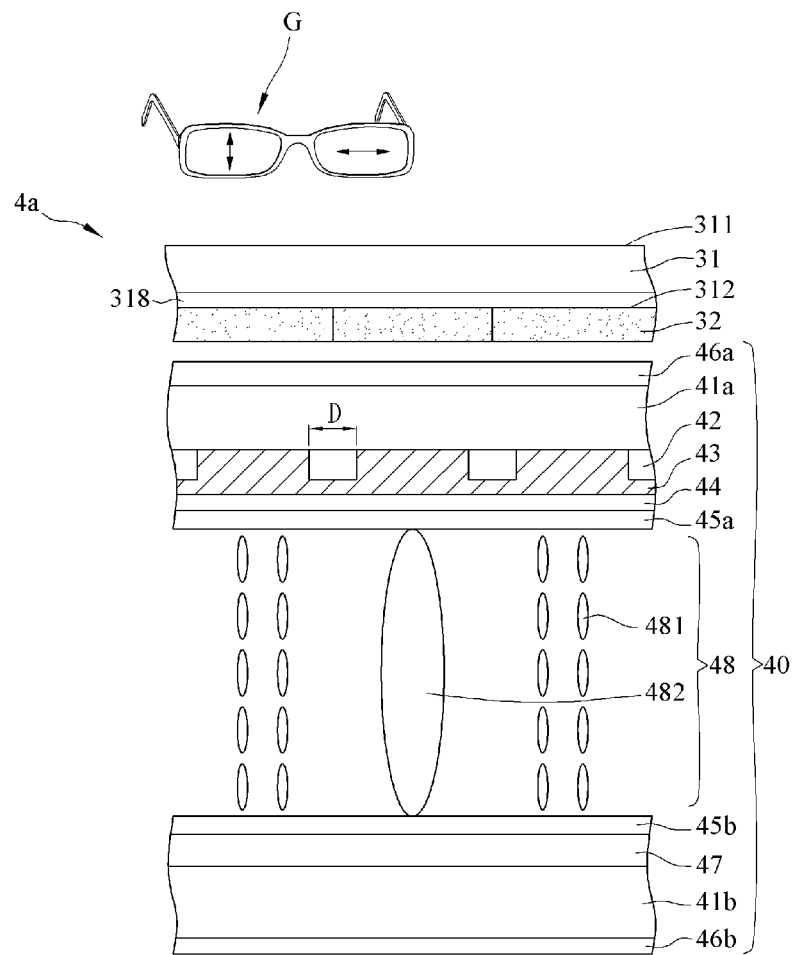
FIGS. 5 and 6 are schematic diagrams illustrating various aspects of a second embodiment of a display module.
Figure 6:
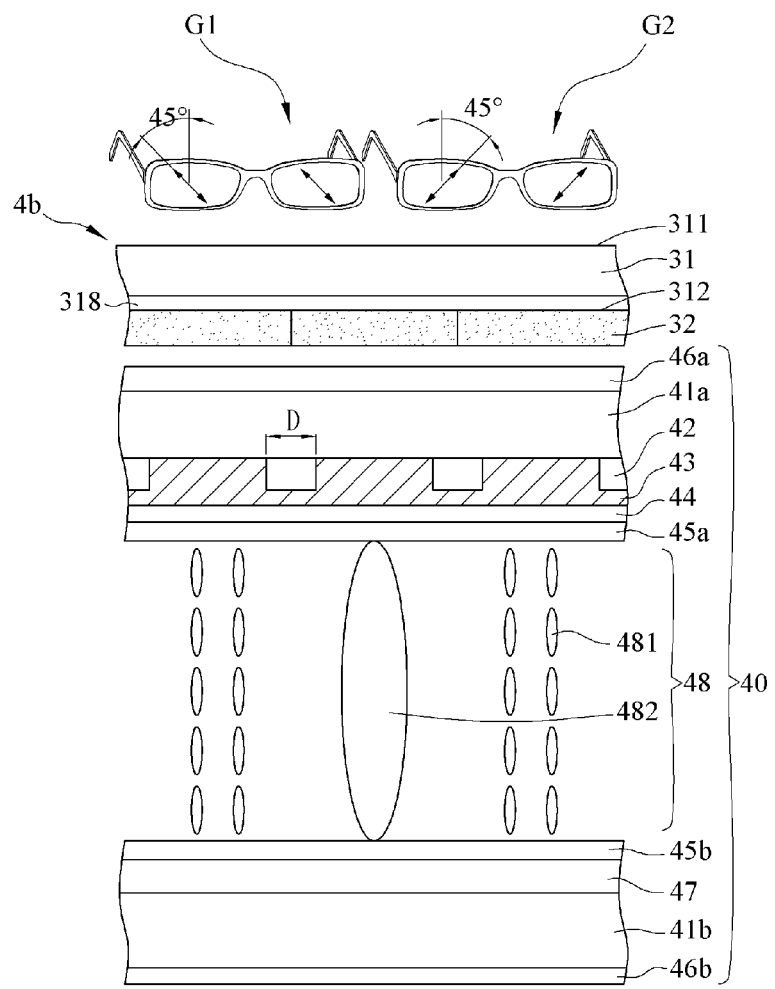

FIGS. 5 to 6 are schematic diagrams illustrating various aspects of a second embodiment of a display module 4, denoted herein as a display module 4a and a display module 4b. For example, as shown in FIG. 5, the substrate unit of the display module 4a can further include a switchable optical retarder 318 which is disposed on the substrate 31 (e.g., on the rear surface 312) or between the front surface 311 and the rear surface 312. The switchable optical retarder 318 can alter the direction of polarization of the light. The switchable optical retarder 318 may include a liquid crystal material or the like. Due to the switchable optical retarder 318, when a viewer wears polarizing glasses G that have a different directions of polarization for each eye, the viewer can see stereoscopic images because the polarizing glasses G allow each eye to receive a respective image. Similarly, as shown in FIG. 6, if two viewers at different locations wear different polarizing glasses G1 and G2, the viewers can view different images so as to achieve a dual view effect.

Figure 7:
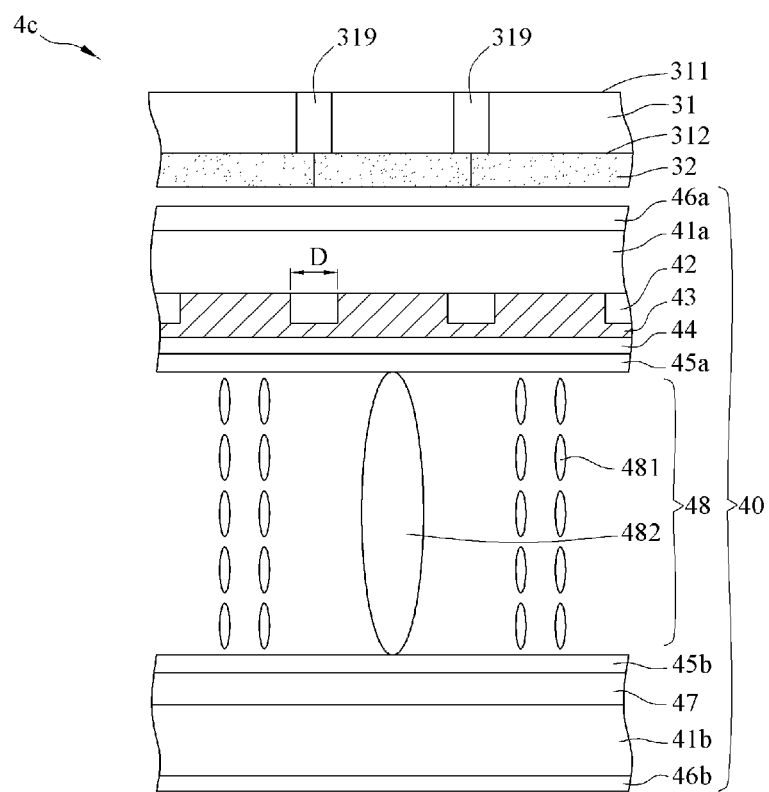
FIG. 7 is a schematic diagram of a third embodiment of a display module.

FIG. 7 is a schematic diagram of a third embodiment of a display module 4, denoted herein as display module 4c. As shown in FIG. 7, the substrate unit of the display module 4c can further include a barrier layer 319. The barrier layer 319 can be disposed on the substrate 31, such as on the rear surface 312, or between the front surface 311 and the rear surface 312, and disposed corresponding to the color filter layer 32 for shielding some pixels of the display panel 40. By shielding the light from some of the pixels, the left and right eyes of the viewer can only receive the light from other pixels which can form stereoscopic images.

Figure 8:
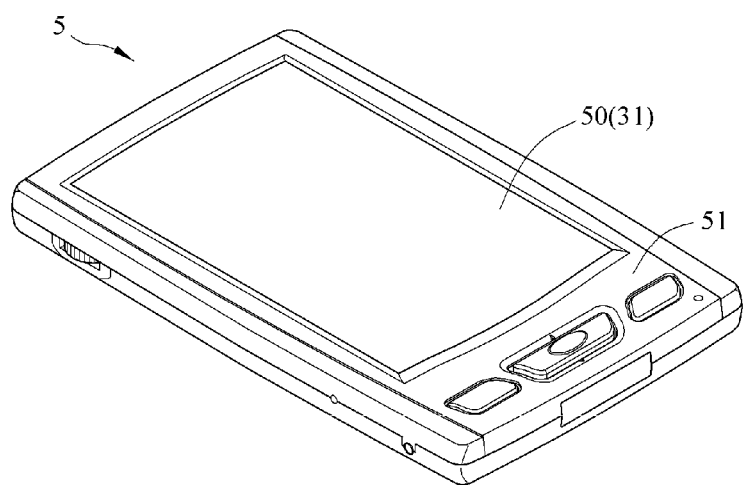
FIG. 8 is a schematic diagram of an embodiment of a display apparatus.

FIG. 8 is a perspective view of an embodiment of a display apparatus 5. The display apparatus 5 includes a display module 50 and a casing 51. The type of the display apparatus 5 is not limited, and the display apparatus 5 may be a personal digital assistant, an LCD apparatus, or a digital TV. The technical features of any of the display modules 4 discussed above are also applicable to the embodiment of the display module 50 illustrated in FIG. 5.

As discussed above, in various embodiments, a color filter layer is disposed on a substrate rather than the display panel, or between the display panel and the substrate, such as on the rear surface of the substrate, or between the front surface and the rear surface, or between the rear surface and the display panel. Therefore, the light will pass through the polarizing layers of the display panel earlier than the color filter layer, so the light will not be changed in polarization before reaching the polarizing layer, so as to enhance display efficiency.

Although the detailed description includes references to specific embodiments, the description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. A substrate unit, which is disposed opposite to a display panel, wherein the display panel comprises a plurality of pixels and two transparent plates disposed opposite to each other, the substrate unit comprising:
    a substrate having a front surface and a rear surface, the rear surface being disposed adjacent to the display panel;
    a color filter layer disposed on the rear surface or between the front surface and the rear surface; and
    a barrier layer disposed on the rear surface or between the front surface and the rear surface, the disposition of the barrier layer corresponding to the disposition of the color filter layer, the barrier layer shielding at least a portion of the pixels of the display panel to convert a 2D image from the display panel to a stereoscopic image.

2. The substrate unit as recited in claim 1, wherein the substrate is a touch panel.

3. The substrate unit as recited in claim 1, wherein the color filter layer is directly formed on or adhered to the rear surface.

4. The substrate unit as recited in claim 1, further comprising:
    a light-shielding layer disposed on the rear surface or between the front surface and the rear surface, the disposition of the light-shielding layer located corresponding to the disposition of the color filter layer.

5. The substrate unit as recited in claim 1, further comprising:
    a switchable optical retarder disposed on the rear surface or between the front surface and the rear surface.

6. A display module, comprising:
    a display panel, wherein the display panel comprises a plurality of pixels and two transparent plates disposed opposite to each other; and
    a substrate unit disposed opposite to the display panel and comprising:
    a substrate having a front surface and a rear surface, the rear surface being disposed adjacent to the display panel,
    a color filter layer disposed between the front surface and the display panel, and
    a barrier layer disposed on the rear surface or between the front surface and the rear surface, the disposition of the barrier layer corresponding to the disposition of the color filter layer, the barrier layer shielding at least a portion of pixels of the display panel to convert a 2D image from the display panel to a stereoscopic image.

7. The display module as recited in claim 6, wherein the substrate is a touch panel.

8. The display module as recited in claim 6, wherein the color filter layer is disposed on the rear surface or between the front surface and the rear surface.

9. The display module as recited in claim 6, wherein the display panel includes a polarizing layer, and the color filter layer is disposed between the polarizing layer and the front surface.

10. The display module as recited in claim 6, further comprising:
    a light-shielding layer disposed on the rear surface, or between the front surface and the rear surface, or to the display panel, and the disposition of the light-shielding layer corresponds to the disposition of the color filter layer.

11. The display module as recited in claim 6, wherein the substrate unit further comprises:
    a switchable optical retarder disposed on the rear surface or between the front surface and the rear surface.

12. A display apparatus, comprising:
    a casing;
    a display panel disposed in the casing, wherein the display panel comprises a plurality of pixels and two transparent plates disposed opposite to each other; and
    a substrate unit disposed opposite to the display panel and comprising:
    a substrate having a front surface and a rear surface, wherein the rear surface is disposed adjacent to the display panel while the front surface is exposed to the casing;
    a color filter layer disposed between the front surface and the display panel; and
    a barrier layer disposed on the rear surface or between the front surface and the rear surface, the disposition of the barrier layer corresponding to the disposition of the color filter layer, the barrier layer shielding at least a portion of the pixels of the display panel to convert a 2D image from the display panel to a stereoscopic image.

13. The display apparatus as recited in claim 12, wherein the display panel is flexible.

14. The display apparatus as recited in claim 12, wherein the color filter layer is disposed on the rear surface or between the front surface and the rear surface.

15. The display apparatus as recited in claim 12, wherein the display panel has a polarizing layer, and the color filter layer is disposed between the polarizing layer and the front surface.

16. The display apparatus as recited in claim 12, further comprising:
    a light-shielding layer disposed on the rear surface, between the front surface and the rear surface, or to the display panel, and located corresponding to the color filter layer.

17. The display apparatus as recited in claim 12, wherein the substrate unit further comprising:
    a switchable optical retarder disposed on the rear surface or between the front surface and the rear surface.

* * * * *